United States Patent Office 3,715,831
Patented Feb. 13, 1973

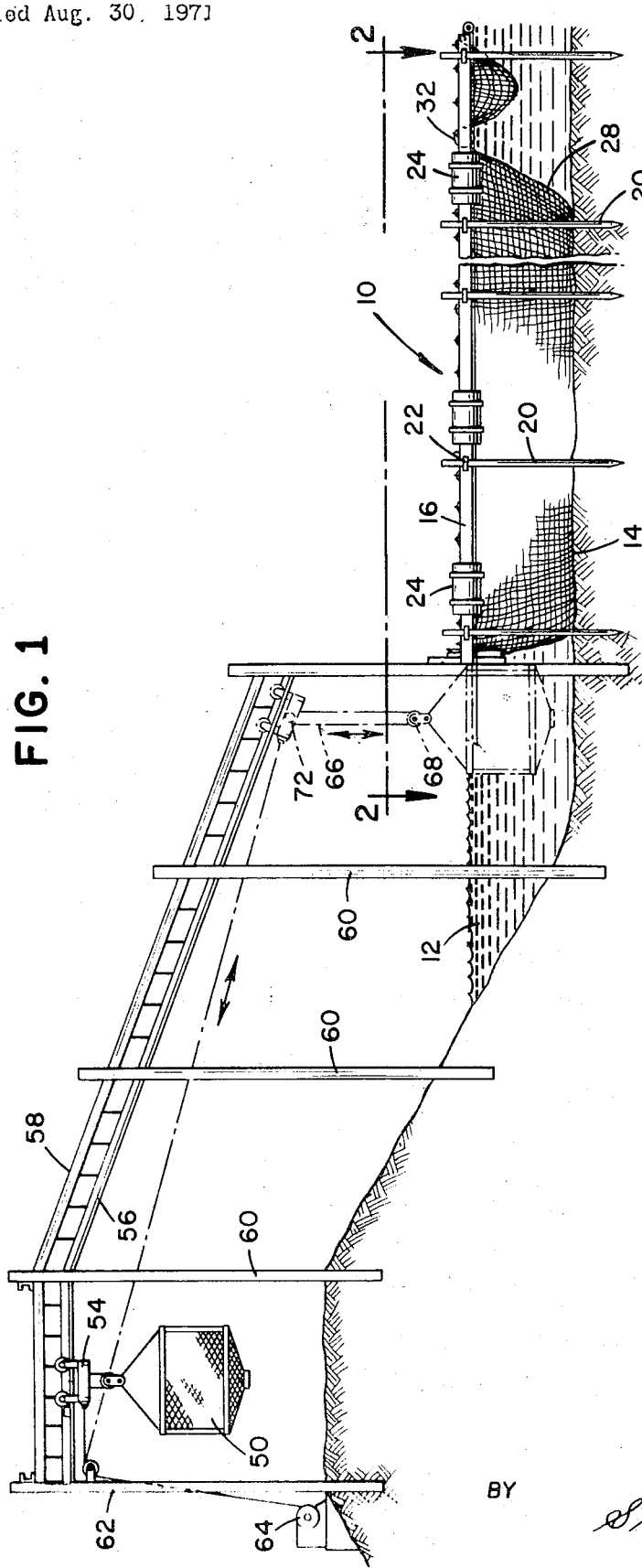
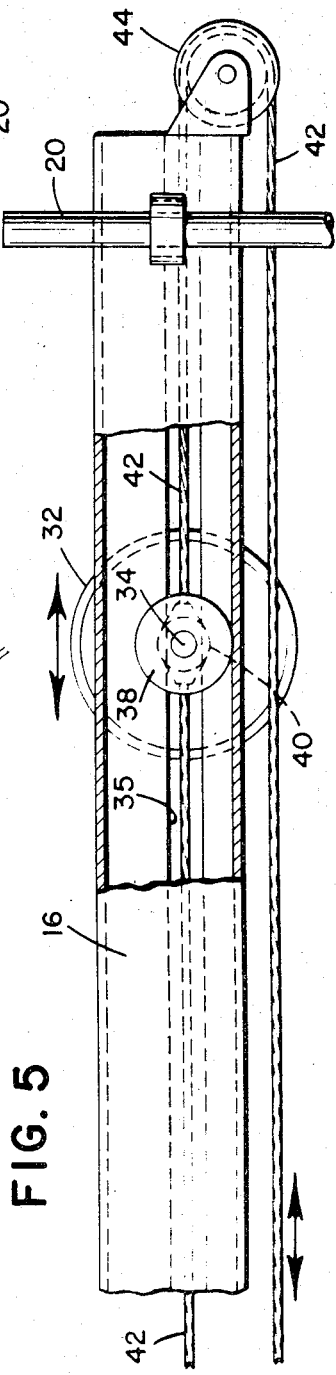
FIG. 1
FIG. 5
INVENTOR
GLENN E. MASON

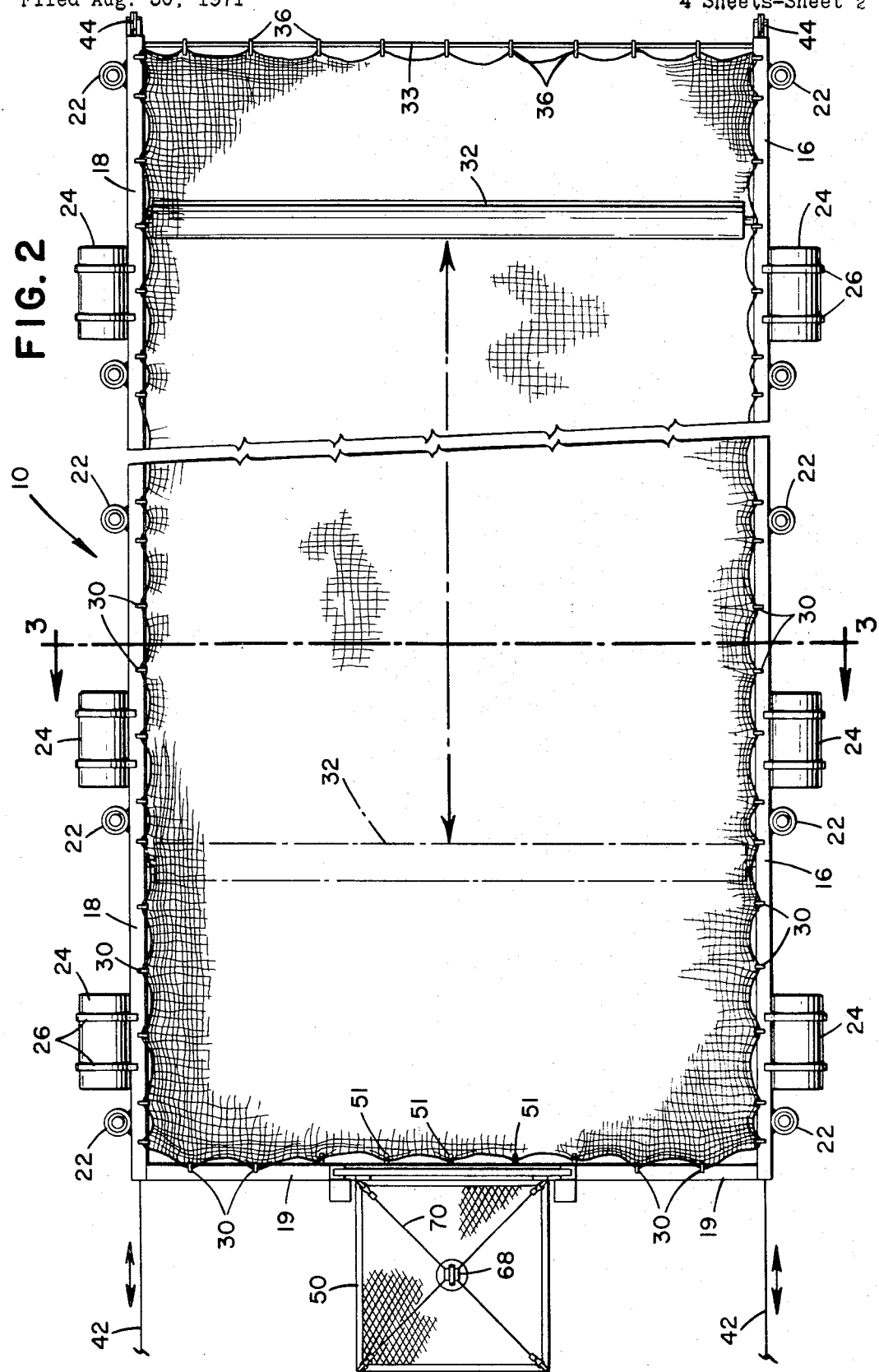

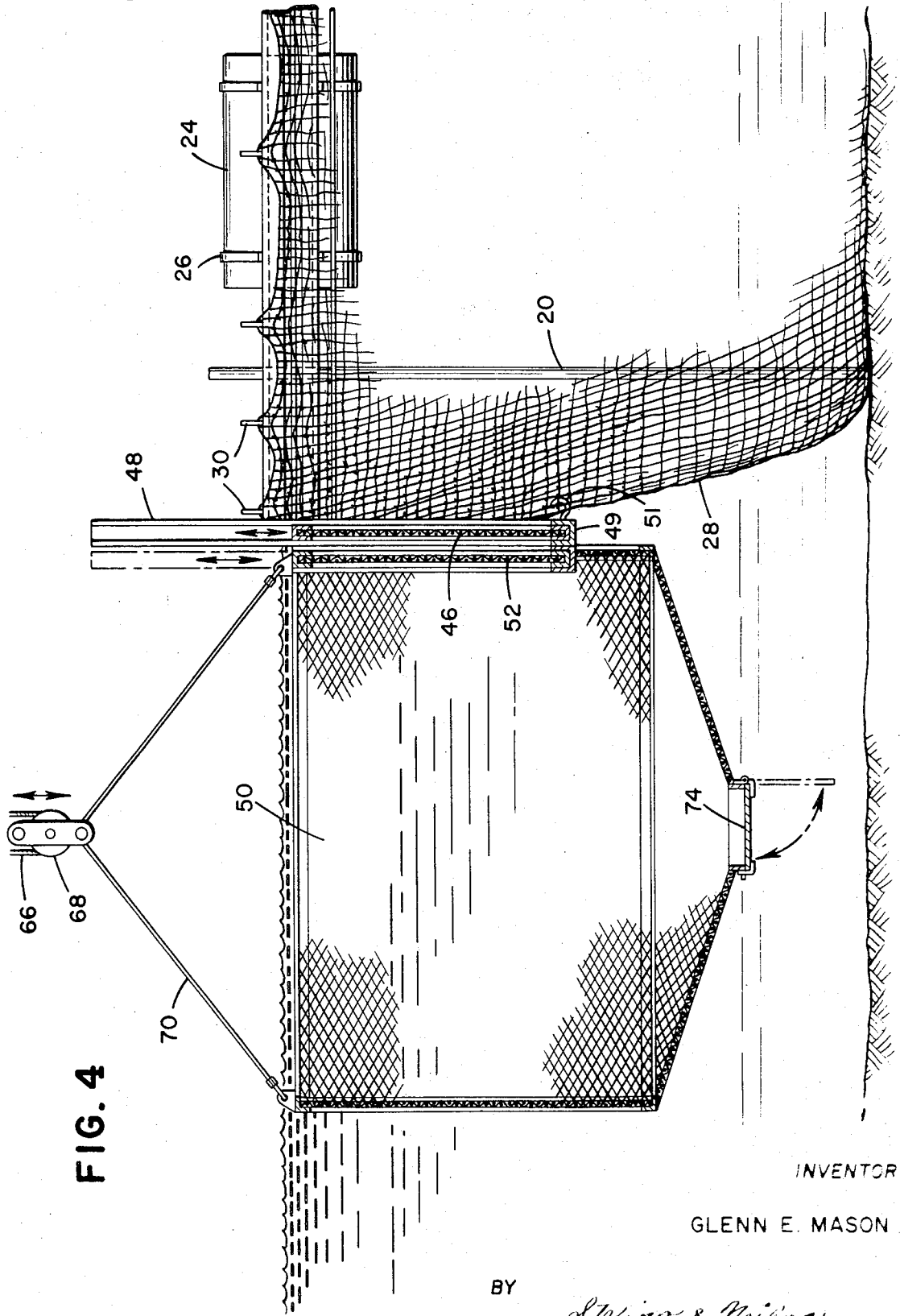

3,715,831
METHOD AND APPARATUS FOR
HARVESTING FISH
Glenn E. Mason, 1134 Martingale Road,
Jackson, Miss. 39206
Filed Aug. 30, 1971, Ser. No. 175,835
Int. Cl. A01k 75/00
U.S. Cl. 43—4.5                    11 Claims

ABSTRACT OF THE DISCLOSURE

Fish are harvested from shallow ponds, etc. having a regulatable water level by providing a net which is initially open at one end in a region which is several feet lower than the lowest portion of the remainder of the bed of the pond or lake so that the fish congregate in this region. Alternatively, the fish may also be lured into a net area by trailing fish food from the rear of a boat. Three sides of the net may be secured to a framework approximately at the water level, and a roller is disposed under the net at the other side of the structure at the water level. Movement of the roller within a rail assembly towards the opposite side of the framework against the underside of the net progressively decreases the volume enclosed by the net and moves the fish towards the side of the apparatus nearest the shore line. The fish are herded into a conveying mechanism which conveys the fish to shore and deposits them in a suitable vehicle. The invention is applicable to the commercial production, processing and sale of fish.

BACKGROUND OF THE INVENTION

The present invention relates to a method and apparatus for catching or harvesting fish from the waters of ponds, lakes or the like. More particularly, the invention relates to the commercial production, catching and sale of edible fish. Although not limited thereto, the invention has especial utility in harvesting fish from bodies of water in which there is provision for readily raising and lowering the water level and wherein there is an area of the bed which is several feet lower than the remainder of the bed.

The use of nets, for example, seines, for catching fish is of course centuries old. Perhaps the most common general method of using nets to catch fish is to tow the net behind one or more small boats, and when fish are caught in the net, the net is elevated and the fish are deposited into the boats. The boats subsequently transport the fish to a mother ship or to land.

It is also known to utilize stationary nets but generally only for special applications, for example, to catch certain species of fish heading to their spawning grounds upstream. Other stationary net structures are based on a maze principle and have one or more relatively small usually conical inlet passages leading into the interior of the structure. Such structures are subject to various disadvantages including the fact that it is necessary to wait passively until fish enter the structure and thus such structures are not suitable for quickly obtaining a large catch of fish.

SUMMARY OF THE INVENTION

It is a primary object of the present invention to provide a novel method and apparatus for catching or harvesting fish on a commercial scale.

Another object of the present invention is to provide a procedure for harvesting fish from bodies of water in which the water level may be raised and lowered wherein advantage is taken of the tendency of the fish to naturally congregate within the deepest water remaining as the water level is lowered.

The invention is accomplished by positioning the novel fish harvester apparatus within a relatively small region at the bottom of the pond, lake, etc. The fish are then induced to congregate in this region. One way to collect the fish is to deposit fish food in the water in a path leading to this area. Another approach is to position the fish harvester apparatus in a small region which is several feet lower than the lowest level of the remainder of the bed. The fish naturally tend to congregate in the deepest water region when the water level of the pond, etc. is intentionally lowered by draining a portion of the water out of the pond. The bed may be prepared in advance to have such a small deeper region, and there should be means for regulating the water level, for example, gates provided in a dam at one end of the body of water.

The harvester apparatus includes a framework which is anchored in the pond bed. A net which is larger than the dimensions of the framework is placed within the framework and allowed to settle to the bottom. The end of the net closest to the shore is fastened to a cross bar of the framework. As the water level is lowered, for example, by opening a flood gate, the fish within the pond tend to congregate within the deepest water remaining, i.e., within the lower depth region of the pond. When this occurs, one or more workers place the longitudinal sides of the net over securing means along the sides of the framework resulting in the net being closed on three sides. To close the outer end of the net, a roller is placed under that end of the net and its ends are connected to guide rails running along the longitudinal sides of the framework approximately at the surface of the water. This outer end of the net is anchored outside of the framework to keep it in place. The roller is then pulled towards the end of the framework adjacent the shore, and in so doing the roller moves under the net and progressively decreases the volume of the region in which the fish are contained and forces the fish towards the end of the net adjacent the shore. When the fish are collected at this end of the net, they are forced into a conveying receptacle which is then moved out of the water via cables or the like. Thereafter, the fish are discharged from the conveying receptacle into a suitable storage container. After the net is emptied, the roller is returned to its starting position and the cycle may be repeated.

After the fish in a given body of water have been harvested, the apparatus may be removed and transported to another body of water for use in harvesting the fish therein.

The above and other objects, features and advantages of the invention will become more apparent as this description proceeds.

BRIEF DESCRIPTION OF THE DRAWINGS

FIG. 1 is a side elevational view of a presently preferred embodiment of the invention.

FIG. 2 is a plan view of a portion of the FIG. 1 embodiment taken on line 2—2 of FIG. 1.

FIG. 4 is an elevational view of a portion of the apparatus showing details of the arrangement for transferring fish caught in the net to a submergible vehicle for transport of the fish to shore.

FIG. 5 is a detail view partly in section illustrating the means for moving the cylindrical member which passes under the net.

DETAILED DESCRIPTION OF THE INVENTION

Figure 3:
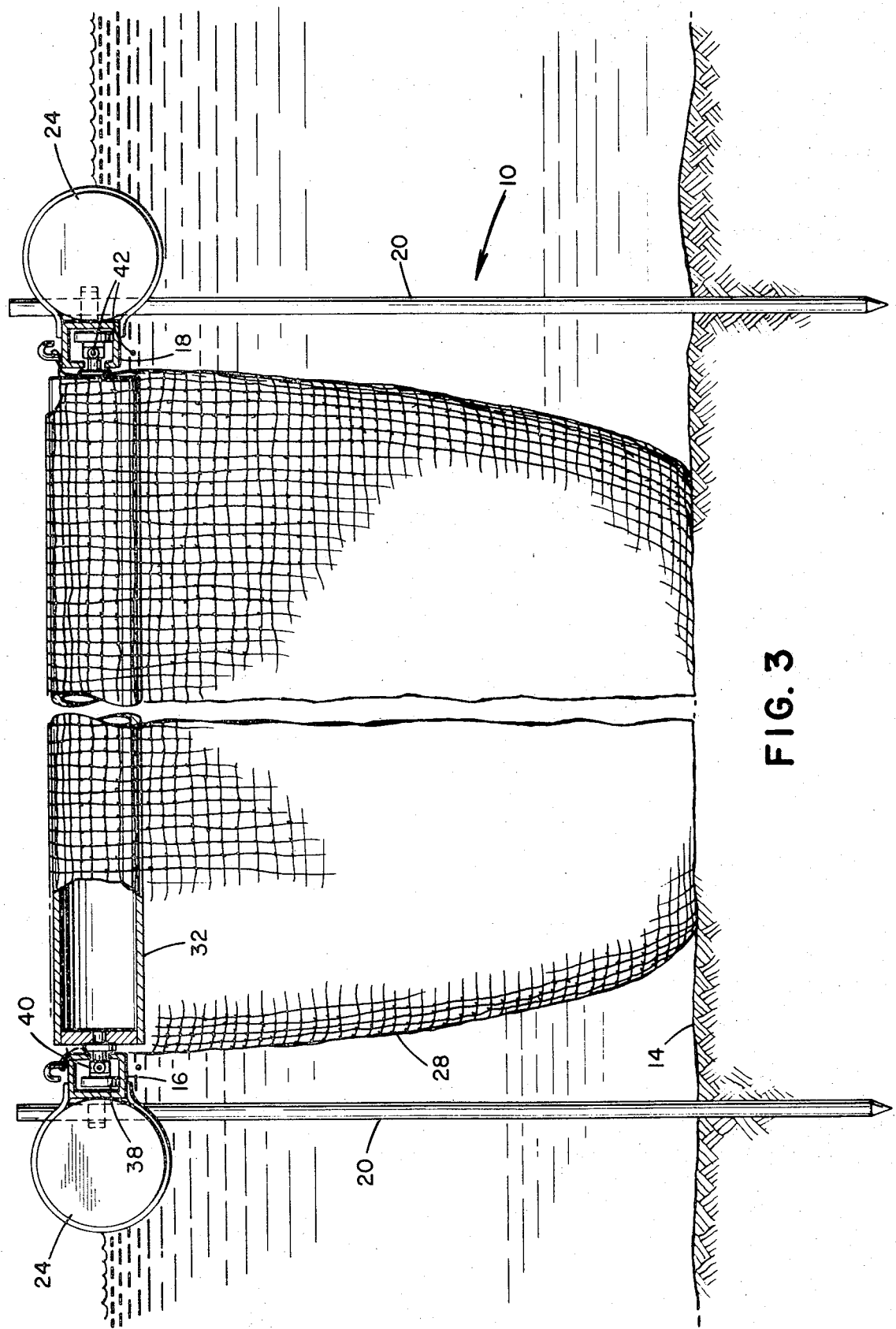
FIG. 3 is a vertical transverse cross-sectional view taken on the line 3—3 of FIG. 2.

Referring now to the drawings, and more particularly to FIG. 1, a fish harvester generally designated by reference numeral 10 is positioned in a body of water 12 above a bed region 14 which is preferably lower than the remainder of the bed. The fish harvester includes a framework comprising a pair of generally horizintal longitudinally extending guide rails 16 and 18, a transverse frame member 19, and a plurality of vertical posts 20 which have their lower ends embedded in the soil of bed region 14. The guide rails are detachably connected to posts 20 by straps 22 which loosely fit around the posts to enable relative sliding movement between the guide rails and the posts. The guide rails are maintained approximately at the water level by spaced buoyant cylindrical members 24 which may be in the form of hollow drums and which are connected to the guide rails by metal straps 26.

A net 28 is positioned within the framework and is of sufficient size to cover the bottom of bed region 14 between the guide rails and extend upwardly to be attached to pegs 30 disposed on the upper surface of the guide rails and on transverse frame member 19. Initially, one or more sides of the net are allowed to drop to the bottom of the body of water 12 so that fish may swim into the region above the net. The fish may be caused to enter the net area according to a presently preferred embodiment of the invention by initially preparing the ground beneath the body of water 12 so that the bed region 14 is deeper than the remainder of the underwater bed, and then reducing the water level, for example, by opening gates provided in a dam (not shown). Upon lowering of the water level there is a tendency of the fish to naturally congregate within the deepest water remaining which brings them within the confines of the net. The fish may also be induced to congregate in the net region by depositing fish food in the water in a path leading to this area. It will of course be appreciated that both of these techniques may be utilized together where circumstances permit. After the fish congregate in the net region, three sides of net 28 are lifted up manually and attached to the pegs 30 along the guide rails 16 and 18 and the transverse frame member 19. The remaining side of the net is placed over a hollow buoyant roller 32 which extends between the guide rails 16 and 18. This side of the net is then anchored to a cable 33 which extends between the ends of the guide rails via hooks 36 as best seen in FIG. 2.

Referring now to FIGS. 2 and 5, the roller 32 is a hollow cylindrical metal member which has sufficient buoyancy to float upon the surface of the water. At each end of the roller a shaft 34 projects into a slot 35 which extends the length of the guide rails. Rollers 38 are connected to the ends of the shafts 34 and roll along the upper surface of the bottom flange of the guide rails 16 and 18. Within the guide rails and adjacent the rollers 38, a cable connector 40 is loosely positioned around each shaft 34 to allow free rotation of the shafts within the connector. The connectors fasten together opposite ends of a cable 42 in an endless loop. The cable 42 passes around a pulley 44 at the right hand end of the apparatus and is driven by a drive pulley (not shown) which may be positioned, for example, upon the shore. In this case, if there is a difference in height between the drive pulley and the guide rails, guide pulleys may be utilized at intermediate points along the traverse of the cable. As the roller 32 moves to the left as seen in FIGS. 1, 2 and 5 it passes under the net with the passed portion of the net remaining upon the pegs 30 which extend above the top of the roller as best seen in FIG. 4. This movement of the roller 32 to the left progressively decreases the area within the net in which the fish are located, and the fish are eventually forced into a small region at the left hand side of the net.

Preferably to FIG. 4, a screen discharge gate 46 may be raised vertically in channels 48 in order to discharge fish from the net into a submergible wire cage fish collection vehicle 50 which has a vertically elevatable screen gate 52 which is positioned immediately adjacent the discharge gate 46. When both gates are in their elevated positions, the fish are swept out of the net into the collection vehicle 50 when the roller 32 reaches the discharge end of the net. Hooks 51 on a horizontal bottom support 49 for the discharge gate 46 are employed to secure the adjacent portion of the net in the vicinity of the bottom of the gate 46.

As seen in FIG. 1, the collection vehicle 50 has a wheeled carriage 54 which runs along an overhead monorail 56 from a point on shore to adjacent the discharge end of the net. The monorail is supported upon an upper frame structure 58 and a plurality of vertical support posts 60. A cable 62 connected to carriage 54 and a power wench 64 are utilized to move the collection vehicle along the monorail 56. When the collection vehicle 50 is moved to the lower end of the monorail, suitable control means (not shown) are utilized to lower the collection vehicle into the water employing a cable 66 which at its lower end is passed over a pulley 68 which is connected to the top of the vehicle 50 by wire 70, and the other end of the cable is connected to a takeup reel 72 which is mounted upon the carriage 54.

After the fish are introduced into the collection vehicle 50, cable 66 is taken up on the reel 72 to elevate the vehicle 50 out of the water to a position closely adjacent the lower end of the monorail. The power wench 64 and cable 62 are employed to move the collection vehicle to the solid line position shown in FIG. 1 where the vehicle is located on shore. The fish are then removed from the vehicle 50 to a suitable storage vessel by opening a trap door 74 in the bottom of the vehicle or by an other suitable procedure. Thereafter, the vehicle 50 is ready for reuse.

The sizes of the net and of the vehicle 50 are of course subject to considerable variation. By way of example only, these structures may be of sufficient size to be utilized with gates approximately 2 feet in height and 8 feet in width. After the roller 32 has been moved to the left hand end of the apparatus, it may be retracted beneath the net to a position adjacent the right hand end of the apparatus, and one or more sides of the net lowered to allow additional fish to center the net region. The previously described cycle of operation of the apparatus may be repeated as many times as is necessary. After the fish have been harvested from one body of water it is contemplated that the entire apparatus which may be readily dismantled may be moved to another body of water to collect the fish therein.

While presently preferred embodiments of the invention have been shown and described with particularity, it will be appreciated that various changes and modifications may readily suggest themselves to those of ordinary skill in the art upon being apprised of the present invention. For example, in lieu of the systems illustrated for moving the roller and the collection vehicle other types of drive means such as endless chains and the like may be substituted. It is intended to encompass all such changes and modifications as fall within the scope and spirit of the appended claims.

What is claimed is:

1. Apparatus for harvesting fish from a body of water comprising a framework adapted to be disposed in a deep region of the body of water, a net connected to said framework and having a bottom portion adjacent the bottom of the body of water, movable means connected to and movable along said framework adjacent the water level, said movable means engaging the underside of the net so that upon movement of said movable means the volume enclosed by said net progressively decreases and fish within the net are caused to move towards a discharge end of the net, and means disposed adjacent the discharge end of said net for receiving the accumulated fish and transporting the fish to the surface of the body of water.

2. Apparatus according to claim 1, wherein said movable means has end portions connected to longitudinal sides of said framework, said net being disposed over the top of said movable means, and means to move said movable means towards said discharge end of said net.

3. Apparatus according to claim 2, further comprising pegs disposed along the longitudinal sides of said framework, the upper edges portions of said net being looped over said pegs, and means including support posts to detachably anchor said framework in said body of water.

4. Apparatus according to claim 2, wherein said movable means comprises a hollow buoyant cylindrical member, and further comprising guide rails disposed along the horizontal sides of said framework and engaging shafts provided at the ends of said cylindrical member.

5. Apparatus according to claim 1, further comprising a discharge gate provided at the discharge end of said net, and a movable, submergible vehicle positioned to receive fish discharged through said gate.

6. Apparatus according to claim 5, further comprising a movable gate connected to said vehicle and adapted to be positioned in juxtaposition with the discharge gate at said discharge end of the net.

7. Apparatus according to claim 5, further comprising cable means to move said vehicle between a loading position adjacent said discharge gate and an on shore unloading position.

8. Apparatus according to claim 1, wherein said framework comprises a pair of guide rails positioned along the longitudinal sides of said framework, a plurality of buoyant members connected to each of said guide rails, and a plurality of support posts connected to said guide rails to allow limited relative movement therebetween and having lower ends embedded in the bed of said body of water.

9. A method for harvesting fish comprising the steps of providing a net at the bottom of a deep region of a body of water, causing fish to congregate in the deep region to enclose fish within the net, progressively decreasing the volume of the region enclosed by the net by moving a member located approximately at the surface of the body of water beneath the net to force the fish into a small area at one end of the net, and conveying the fish from said one end of the net to the surface of the body of water.

10. A method according to claim 9, further comprising reducing the normal water level of the body of water to enhance the tendency of the fish to naturally concentrate within the deep region.

11. A method according to claim 10, further comprising initially constructing said deep region so that this region is several feet deeper than the remaining bed under the body of water, the area of this region being selected so that the net encloses at least a substantial portion of this region.

References Cited

UNITED STATES PATENTS

| | | | |
|---|---|---|---|
| 462,258 | 11/1891 | Jones | 43—8 |
| 3,113,394 | 12/1963 | Puretic | 43—6.5 |
| 3,553,879 | 1/1971 | Ellis | 43—8 |
| 3,596,394 | 8/1971 | Reeder | 43—6.5 |

WARNER H. CAMP, Primary Examiner

U.S. Cl. X.R.

43—6.5, 8